B. F. SILLIMAN.
STEAM GENERATOR.
APPLICATION FILED JULY 6, 1908.
943,277.
Patented Dec. 14, 1909.
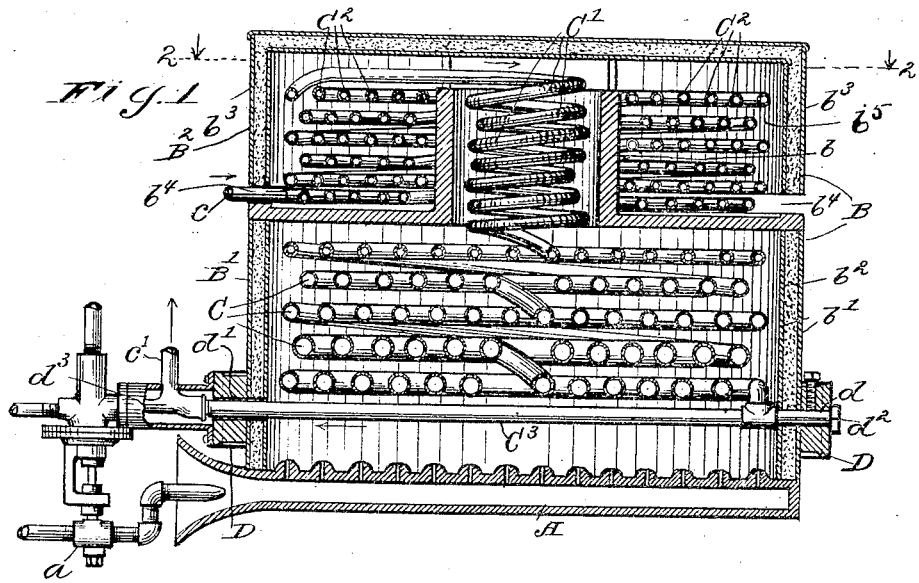
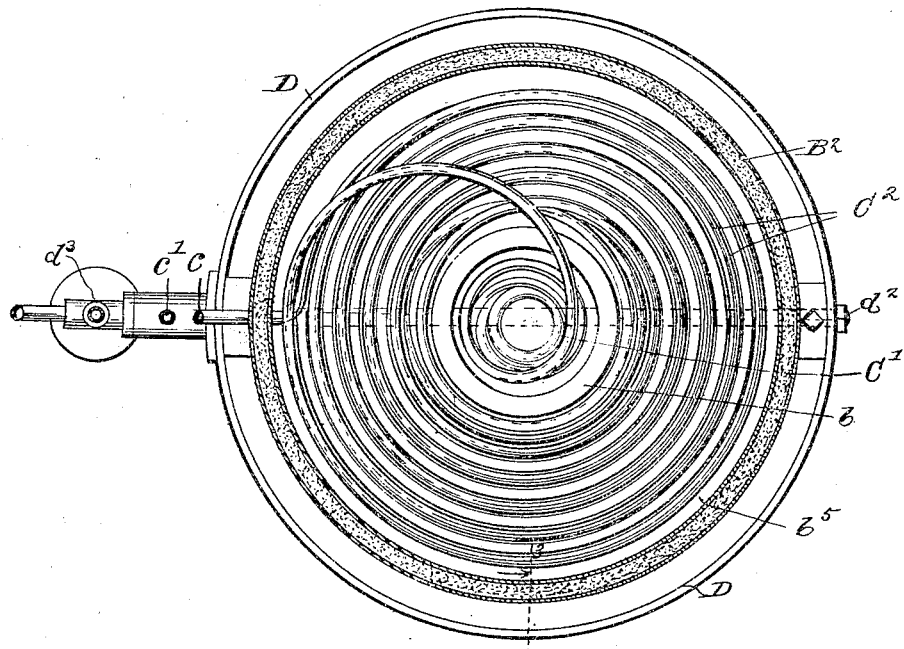
Witnesses.
J. C. Turner
Jno. F. Oberlin
Inventor.
Benjamin F. Silliman
by
J. B. Fay
Attorney.

| UNITED STATES PATENT OFFICE.

BENJAMIN F. SILLIMAN, OF CLEVELAND, OHIO.

STEAM-GENERATOR.

943,277.  Specification of Letters Patent.  Patented Dec. 14, 1909.

Application filed July 6, 1908. Serial No. 441,936.

*To all whom it may concern:*

Be it known that I, BENJAMIN F. SILLIMAN, a citizen of the United States, resident of Cleveland, county of Cuyahoga, and State of Ohio, have invented a new and useful Improvement in Steam-Generators, of which the following is a specification, the principle of the invention being herein explained and the best mode in which I have contemplated applying that principle, so as to distinguish it from other inventions.

The present invention relating as indicated to steam generators has more particular regard to generators of the "flasher" type, such as are generally used in connection with motor cars and boats.

Among the objects of the present invention may be enumerated the attainment of increased economy and capacity without correspondingly enlarging the generator over present types, the provision of a generator, the tubes of which may be effectually drained, and an improved arrangement of thermostatic control, or regulating device, in connection with such generator.

To the accomplishment of the above and related objects said invention, then, consists in the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing: Figure 1, is a central vertical section of a steam generator embodying my several improvements; Fig. 2 is partly a horizontal section and partly a plan view of the same, the section being taken on the line 2—2, Fig. 1; and Fig. 3 is a sectional view of the detail of the construction of said generator taken on the line 3—3, Fig. 2.

The source of heat from my generator is shown in the form of a gas burner A, which is of well known construction, and accordingly, does not require any detailed description. It will be understood, of course, that in place of such burner any suitable heating means may be employed. The gas for the burner is supplied through a controlling valve $a$ operated by means of a thermostatic regulating device, to which more particular reference will be made presently.

Supported above the burner just described is the casing B, of the generator, such casing comprising a lower member B′ of general annular form, the upper portion $b$ of which is of constricted cross-sectional area. The details of construction of such casing are for present purposes a matter of indifference, although as shown the outer walls $b'$ thereof are preferably double and a suitable heat insulating material $b^2$ interposed therebetween. Surmounting such lower casing member is an upper member B² forming a cover for, and laterally inclosing the portion $b$ of said lower member just referred to as being of constricted cross-sectional area. The lateral walls $b^3$ of said upper casing member do not quite close down onto the lower member, but an opening $b^4$ extending around more or less completely the entire periphery of the generator is provided. This opening serves, as will appear in the sequel, for the final escape of the heated gases furnished by the burner, and to this end will ordinarily, in the completed structure, be connected with a suitable stack, (not here shown) whereby such gases may be discharged, as will be readily understood.

The several coils of pipe composing the generator proper are disposed within the different portions of the casing B just described, in the manner now to be explained. In the lower portion of the main casing member B, are provided a series of superposed coils C of pipe serially connected so as to drain freely toward the outlet opening at the bottom. In other words, there are no risers or other connections employed between the respective coils that might form traps for the retention of water or other condensed liquid therein, but instead the successive coils are in effect a single continuous length of pipe wound about from circumference to center and from center to circumference. Continuous with the uppermost of the coils C in such lower casing member is a similar set of coils C′ of smaller diameter conforming with the diameter of the constricted portion $b$ of said casing member, but in their general arrangement and mode of connection corresponding substantially with the arrangement and connection of coils C just described. These coils C' are in turn connected at their point of highest elevation with a series of annular coils $C^2$ disposed in the annular chamber $b^5$ formed between the constricted portion of the lower casing member and the surrounding upper casing member. These annular coils $C^2$ are likewise wound and serially connected so as to drain freely downwardly from such point of highest elevation to the inlet opening $c$ of the generator, in the same fashion that the other coils have been seen to drain downwardly to the outlet opening $c'$ of the generator.

The number of coils within the respective portions of the casing may obviously be varied from that shown without departing from the spirit of the invention. I should call attention, however, to the desirability of varying the size of the pipe entering into the coils in such compartments so that the pipe of larger diameter will be found in the lowermost coils within the main compartment of the lower casing member B', while those located in the constricted portion $b$ of said member and also in the annular chamber surrounding such portion, are of considerably smaller diameter, the size of the pipe, in other words, gradually diminishing from the steam outlet to the water inlet. Thus, for example, where the number of coils is substantially as shown, I should make the two lowermost coils in the main casing member of ¾ inch diameter, the two succeeding coils of ½ inch diameter, the next of ⅜ inch diameter, while the coils in the constricted portion of such lower member and in the annular chamber are of ¼ inch diameter.

The water for the generator is supplied at what has been referred to as the inlet opening $c$, so that it will have to pass, as will be obvious, around and around through the coils $C^2$ in annular chamber $b^5$ until it reaches the highest point in such coils, whence it passes over and takes a downward course through the small coils C', and then the large coils $C^2$, of the respective portions of the lower casing member, until it finally reaches the outlet opening $c'$. Throughout the path which it thus traverses there will be flowing in an opposite direction the heating medium, specifically the heated gases arising from the burner A. The number and arrangement of coils is designed to be such that the water pending its passage through the annular chamber will be heated by these gases substantially to the point of boiling, so that as it flows over into the smaller coils it will be flashed into steam, and the steam thence passing downwardly into the regular coils is superheated to the desired degree, in which condition it passes out by way of the outlet $c$ and the steam supply pipe to the engine.

The pipe in the coils thus devoted to the heating of the water, it will be noted are of relatively small diameter, whereby a more rapid and complete abstraction of heat from the heating medium is rendered possible prior to the discharge of the latter from the apparatus, than would be possible were pipe of larger diameter employed in such coils.

By the unique construction of the lower casing member a marked concentration of heat is had within the constricted portion of such member thus insuring the instantaneous vaporization or flashing of the water into steam as it passes over into the corresponding coils. The series of coils in the lower portion of such member finally serve to store the steam thus provided in an adequate amount to prevent the generator, and particularly this portion thereof, from ever becoming chilled by a sudden rush of water such as otherwise might be induced by excessive demands for power.

Allusion has been made to the use of a thermostatic regulator for controlling the supply of fuel to the burner of the generator. The general features of construction of the thermostat as well as of the method of control illustrated in connection therewith are set up and claimed in my co-pending application Serial No. 428,043, filed April 20, 1908. Certain details of improvement, however, in the thermostat's structure may be here noted. A feature common in such previous structure and the one here disclosed is the utilization of the lower terminal portion $C^3$ of the generator coil for the thermosensitive element. In the first instance I supported the fixed end of this thermo-sensitive element directly from the generator casing; in lieu of this arrangement I here propose to support the same from a rigid external supporting member D, preferably annular in form and surrounding the lower portion of the generator casing, from which, however, it is desirably insulated by a layer of asbestos. To impart the rigidity referred to the member is preferably made of T cross-section, suitable apertures $d$ $d'$ being provided therein, the one for the reception of a plug $d^2$ whereby the corresponding portion of tube $C^3$ is fixedly secured thereto, the other to slidably support the other end of such tube and the operative element, in the form of control valve $d^3$, connected therewith. Such valve serves to operate fuel-control valve through a suitable pressure medium and connecting parts of no direct interest here, all being fully set forth in the application identified above.

It should be obvious, without remark, that the arrangement of supporting means just described may be utilized in connection with the more familiar form of independent thermostatic element just as well as with the one here shown; also the particular apparatus operated by such element is for present purposes a matter of indifference.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In a steam generator, the combination of heating means, a casing above the same having an upper portion of restricted cross-sectional area, and a plurality of connected coils of pipe disposed within said casing and about such restricted portion thereof, said coils being so arranged and connected that the direction of flow therethrough is upwardly from the water inlet through the coils disposed without said casing and thence downwardly through those within said casing to the steam outlet.

2. In a steam generator, the combination of heating means, a casing above the same having an upper portion of restricted cross-sectional area, a plurality of connected coils of pipe disposed within said casing and about such restricted portion, and a casing member inclosing such restricted portion and the coils thereabout, whereby the heating medium is conducted upwardly and then downwardly, said coils being so arranged and connected that the direction of flow therethrough is opposite to that of such heating medium.

3. In a steam generator, the combination of heating means, a casing above the same having an upper portion of restricted cross-sectional area, and a plurality of coils of pipe connected serially and disposed in the respective portions of said casing, and about such restricted portion, said coils being so arranged that the direction of flow is upwardly from the water inlet through the coils disposed without said casing and thence downwardly in succession through those within the upper and lower portions of said casing to the steam outlet.

4. In a steam generator the combination of heating means, a casing above the same comprising a lower member having an upper portion of restricted cross-sectional area and an upper member inclosing such restricted portion of said lower member, whereby the heating medium is conducted upwardly and then downwardly, and a plurality of coils of pipe serially connected and disposed within the respective portions of said lower casing and in the annular chamber between the latter and said upper casing, the direction of flow through said coils being opposite to that of such heating medium.

5. In a steam generator, the combination of heating means, a casing above the same, and a plurality of coils of pipe connected serially and disposed in part within and in part without said casing, said coils draining freely from the point of junction between those coils located within and those located without said casing.

6. In a steam generator, the combination of heating means, a casing above the same having an upper portion of restricted cross-sectional area, and a plurality of coils of pipe connected serially and disposed within said casing and about such restricted portion thereof, said coils draining freely in either direction from the point of junction between those located within said casing and about such restricted portion.

7. In a steam generator, the combination of heating means, a casing above the same having an upper portion of restricted cross-sectional area, a plurality of connected coils of pipe disposed within said casing and about such restricted portion, and a casing member inclosing such restricted portion and the coils thereabout, whereby the heating medium is conducted upwardly and then downwardly, the direction of flow through said coils being opposite to that of such heating medium, and said coils draining freely in either direction from the point of junction between those located within said casing and about such restricted portion.

8. In a steam generator, the combination of heating means, a casing above the same comprising a lower member having an upper portion of restricted cross-sectional area and an upper member inclosing such restricted portion of said lower member, whereby the heating medium is conducted upwardly and then downwardly, and a plurality of coils of pipe serially connected and disposed within the respective portions of said lower casing and in the annular chamber between the latter and said upper casing, the direction of flow through said coils being opposite to that of such heating medium, and said coils draining freely from the point of junction between those disposed in the restricted portion of said lower casing and in such annular chamber, to the water inlet and steam outlet, respectively.

9. In a steam generator, the combination of heating means, a casing above the same having an upper portion of restricted cross-sectional area, and a plurality of connected coils of pipe disposed within said casing and about such restricted portion thereof, the diameter of the pipe lying within the casing being larger than that of the pipe about such restricted portion, and said coils being so arranged and connected that the direction of flow therethrough is upwardly from the water inlet through the coils disposed without said casing and thence downwardly through those within said casing to the steam outlet.

10. In a steam generator, the combination of heating means, a casing above the same having an upper portion of restricted cross-sectional area, and a plurality of coils of pipe connected serially and disposed in the respective portions of said casing and about such restricted portion, the pipe in such restricted portion being of smaller diameter than that in the main portion of said casing, and that about such restricted portion being of smaller diameter than that within.

11. In a steam generator the combination of heating means, a casing above the same comprising a lower member having an upper portion of restricted cross-sectional area and an upper member inclosing such restricted portion of said lower member, whereby the heating medium is conducted upwardly and then downwardly, and a plurality of coils of pipe serially connected and disposed within the respective portions of said lower casing and in the annular chamber between the latter and said upper casing, the direction of flow through said coils being opposite to that of such heating medium, and the diameter of the pipe in the coils decreasing gradually from the steam outlet to the water inlet.

Signed by me, this 3rd day of July, 1908.

BENJAMIN F. SILLIMAN.

Attested by—
D. T. DAVIES,
JNO. F. OBERLIN.